March 16, 1926.
S. R. THOMAS
1,577,048
STEERING COLUMN STRUCTURE
Filed April 23, 1925
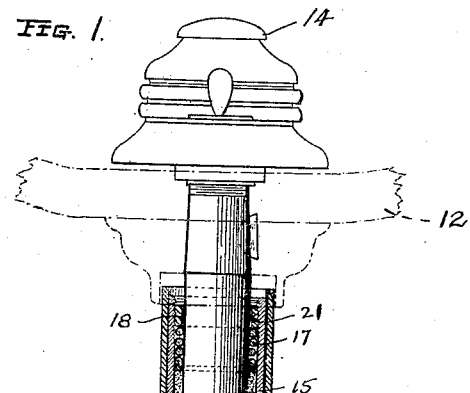
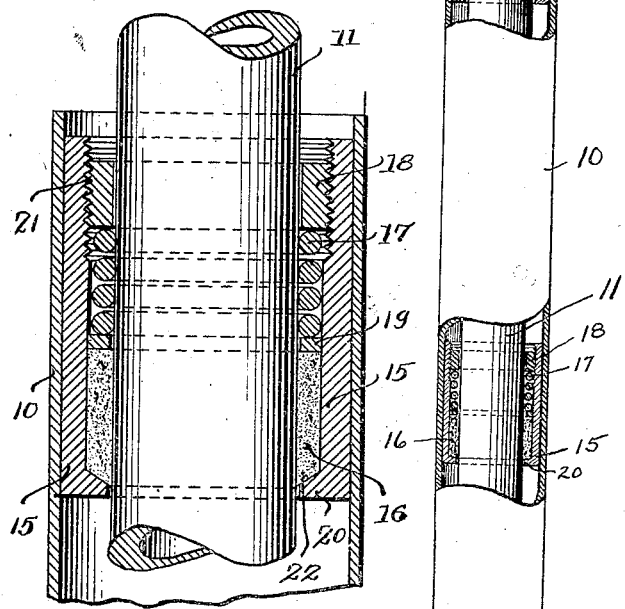
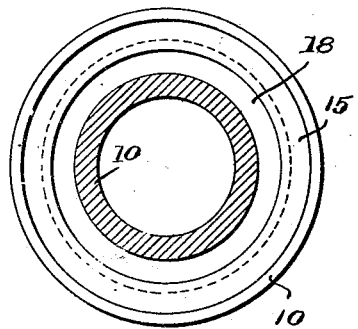
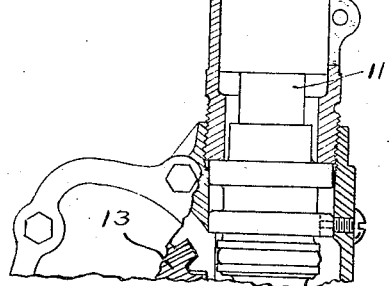
Inventor
Stanley R. Thomas
Lloyd L. Evans
Attorney Patented Mar. 16, 1926.

1,577,048

UNITED STATES PATENT OFFICE.

STANLEY R. THOMAS, OF CLEVELAND, OHIO, ASSIGNOR TO JORDAN MOTOR CAR COMPANY, INC., OF CLEVELAND, OHIO, A CORPORATION OF DELAWARE.

STEERING-COLUMN STRUCTURE.

Application filed April 23, 1925. Serial No. 25,229.

*To all whom it may concern:*

Be it known that I, STANLEY R. THOMAS, a citizen of the United States, residing at Cleveland, in the county of Cuyahoga and State of Ohio, have invented a certain new and useful Improvement in Steering-Column Structures, of which the following is a full, clear, and exact description, reference being had to the accompanying drawings.

This invention relates to steering apparatus for motor driven vehicles, and more particularly to bushings for eliminating rattle of the steering post within the column. The invention is an improvement on that disclosed in my copending application, Serial No. 2490, filed January 15, 1925, in which the broader aspects of the invention are being claimed.

During the operation of motor driven vehicles, vibrations are transmitted to the steering post which are caused by the operation of the motor and by the irregular surfaces of roads. The steering mechanisms are of such construction that operating thrusts are transmitted to the steering post, and such thrusts, together with the vibrations, cause the steering post to move laterally within the fixed tubular column through which it extends. As the post and column are usually constructed of metal, such movement of the post in the column will cause a rattle unless bushings are placed therebetween to prevent contact.

It is customary practice to provide bushings of some character to serve the purpose of preventing contact of the post with the column in its lateral movement. Such bushing constructions are made up of several elements which are assembled part by part with the column and post, and are of such character that replacement is quickly required due to the severe wear that is caused by the rotation and lateral movement of the post. With such constructions replacement of parts entails considerable time and expense.

An object of my invention is to provide a bushing construction which will automatically maintain a tight engagement with the steering post as the packing element becomes worn so as to increase the length of time during which the bushing will hold the post sufficiently against lateral movement to prevent its contacting with the steering column.

A further object of my invention is to provide an assembled bushing construction which can be associated with and removed from a position intermediate the column and steering post as a unit.

Another object of my invention is to provide a unitary bushing construction for preventing the steering post from rattling in the column which is of such a character that the packing element will be automatically maintained tightly against the post as it becomes worn.

With the above and other objects in view, the invention may be said to comprise the device as illustrated in the accompanying drawings, hereinafter described and particularly set forth in the appended claims, together with such variations and modifications thereof as will be apparent to one skilled in the art to which the invention appertains.

Reference should be had to the accompanying drawings forming a part of this specification, in which Figure 1 is a fragmentary side elevation of a steering post and column showing portions thereof and bushing assemblies associated therewith in section.

Fig. 2 is an enlarged longitudinal section of one of the bushing assemblies associated with the post and column.

Fig. 3 is a transverse sectional view taken on line 3—3, Fig. 2, showing a top plan of a bushing assembly.

Referring now to the drawings by characters of reference, 10 represents a fixed tubular column in which the rotatable steering post 11 is mounted. The upper end of the post extends beyond the column and a hand wheel 12 is removably secured thereto, while the lower end of the post carries a worm which is in mesh with the gear segment 13 operatively connected with the steering arms of the front wheels of a motor driven vehicle. The steering mechanism so far described and the manner of operating the same are well known in the art and, therefore, no further description thereof is thought to be necessary to understand my invention which will follow.

Vibrations and thrusts, above referred to, will be transmitted to the post, causing it to move laterally within the casing, and consequently bushings, interposed to prevent the post from contacting with the column to prevent rattling, will be subjected to severe wear which in time destroys their usefulness for such purpose.

The present invention comprises an assembled bushing construction which can be interposed and removed from between the post and column as a unit, and which is arranged to automatically cause the packing element thereof to tightly engage the post, after being considerably worn, sufficiently to prevent the post from contacting with any metal parts in its lateral movements. I have shown two similar bushing constructions in the drawings, one located adjacent each end of the column, but it is to be understood that any desired number may be used. The bushings can be positioned and removed from the steering post as a unit when the hand wheel 12 and the signal button 14 are removed from the post.

Each of the bushing constructions consists of a tubular housing element 15, a tubular packing element 16, a coil spring 17, a spring compressing nut 18 and a washer 19 which is interposed intermediate the spring and the packing. The housing is of such external diameter that it will fit snugly within the column. One end of the housing is formed with a wall 20, while the opposite end may be threaded internally, as indicated by the numeral 21. The wall 20 is provided with a central aperture of greater diameter than the post, so that the post will be free to move laterally when the bushing is positioned therearound. The inner face 22 of the end wall 20 is beveled and provides a seat for one end of the tubular packing element 16. The packing is carried within the housing member and is normally of such thickness to fill the space between the inner wall of the housing and the outer wall of the steering post when the bushing is in operative position.

The washer 19 is carried within the tubular housing and bears against the unseated end of the packing element, and provides a seat for one end of the coil spring which is carried within the housing. When the packing, washer and spring are assembled within the housing as described, the nut 18 is screwed into the threaded end of the housing against the spring, and serves to retain the assembled parts together as a unit construction, as well as tensioning the spring to compress the packing element. It will be seen that the nut is threaded exteriorly and is apertured centrally to permit the steering post to move laterally therein. The post can also move laterally within the washer and the spring. By compressing the packing element sufficiently it will tightly engage the post, thus forming the only portion of the bushing assembly contacting with the post. The packing is placed under compression by the spring and nut so that it offers sufficient resistance to prevent the post from contacting with the other parts of the bushing.

The spring will exert sufficient pressure to automatically maintain the packing tightly against the post after it has become considerably worn by the rotation and lateral movement of the post, and will thus increase the life of the packing so that replacement of the packing will be more infrequent.

To position and remove the bushing assemblies, the wheel 12 and button signal 14 must be removed, and then the unit assembly can be slipped over the end of the steering post. The housing fits snugly within the column and can be moved lengthwise therein to be placed in any desired position. This relation of the housing within the column provides a rigid support for the packing which offers sufficient resistance to the lateral movement of the post to prevent metallic contact such that will cause rattling.

It will thus be seen that I have provided a simple structure which is durable, which can readily be positioned and removed, and which can be readily renewed when necessary, thus saving considerable time and expense.

It will be understood that the particular forms of apparatus shown and described are presented for purposes of explanation and illustration, and that various modifications thereof can be made without departing from the spirit of my invention and the scope of the claims.

What I claim is:

1. In an automobile steering apparatus, the combination with a fixed tubular column and a rotatable steering post extending through said column, of a bushing for said post mounted in said column, comprising a tubular housing engaging the interior wall of said column, an annular packing carried by said housing, and means carried by said housing for compressing said packing tightly against said post, the lateral movement of said post in said housing and column being resisted by said compressed packing to prevent rattling.

2. In an automobile steering apparatus, the combination with a fixed tubular column and a rotatable steering post extending through said column, of a bushing for said post mounted in said column, comprising a tubular housing engaging the inner wall of said column through which said post extends and is free to move laterally, an annular packing carried by said housing, a coil spring bearing against said packing, and means associated with said housing for securing said spring to compress said packing into tight engagement with said post, the lateral movement of said post being resisted by said packing to prevent said post from contacting with said housing.

3. In an automobile steering apparatus, the combination with a fixed tubular column and a rotatable steering post extending through the column, of a bushing assembly for said post mounted in said column, comprising a tubular housing engaging the inner wall of said column and having an apertured end wall, a tubular packing seated upon the end wall of said housing, a coil spring bearing against said packing, and an apertured nut screwed into the end of said housing to retain said packing and spring therein and compressing said spring to maintain said packing tightly against said post, said post extending through the elements of said bushing and held out of contact with said housing and nut in its lateral movement by the resistance of said packing.

4. In automobile steering apparatus, the combination with a tubular fixed steering column and a rotatable steering post extending through the column, of a unitary bushing assembly for said post removably mounted in said column, comprising a tubular housing slidably engaging the interior wall of the column, an annular packing carried by said housing for engaging said post, and means mounted with said housing for compressing said packing to tightly engage said post, said packing resisting the lateral movements of said post sufficiently to prevent its contact with said housing.

5. In automobile steering apparatus, the combination with a fixed tubular steering column and a rotatable steering post extending through said column, of a unit bushing assembly removably mounted in said column for resisting the lateral movement of said post, said unit assembly comprising a tubular housing slidably engaging the interior wall of said column, and an annular packing carried by said housing for tightly engaging said column and limiting the lateral movement thereof in said column.

6. In an automobile steering apparatus, the combination with a fixed tubular column and a rotatable steering post extending through said column, of a bushing for said post mounted in said column, comprising a housing engaging the interior wall of said column, a packing element seated in said housing, a spring for compressing said packing tightly against said post, and means adjustable with said housing for tensioning said spring, the lateral movement of said post in said column being resisted by said packing to prevent rattling.

7. In an automobile steering apparatus, the combination with a fixed tubular column and a rotatable steering post extending through said column, of a plurality of unitary bushing assemblies for said post removably positioned within said column, each of said unitary bushing assemblies comprising a tubular housing engaging the interior wall of said column and adjustable longitudinally therein, a tubular packing member seated interiorly of said tubular housing and engaging said post, and means carried by said housing for retaining and compressing said packing within said housing, said packing when compressed forming the sole bearing within said column for said post and resisting the lateral movement thereof sufficiently to prevent contact with said column and housing.

8. In an automobile steering apparatus, the combination with a fixed tubular column and a rotatable steering post extending through said column, of a unitary assembled bushing for said post removably mounted in said column, comprising a tubular housing slidably engaging the interior wall of said column, said housing being threaded interiorly at one end and having an end wall at the other end, a tubular packing seated upon said end wall within said housing engaging said post, a coil spring bearing against an end of said packing within said housing, and an apertured nut engaging the threaded end of said housing for placing said spring under desired tension, said spring automatically compressing said packing to maintain it in tight engagement with said post to limit the lateral movement thereof sufficiently to prevent contact of the post with the other elements of the assembly and the column.

In testimony whereof, I hereunto affix my signature.

STANLEY R. THOMAS.